US012086233B2

(12) United States Patent
Khaund et al.

(10) Patent No.: US 12,086,233 B2
(45) Date of Patent: Sep. 10, 2024

(54) LIFECYCLE MANAGEMENT OF SECRETS ON SERVERLESS PLATFORM

(71) Applicant: Microsoft Technology Licensing, LLC, Redmond, WA (US)

(72) Inventors: Bhaskardeep Khaund, Bothell, WA (US); Bo Wu, Jiangsu (CN); Yiqun Wang, Suzhou (CN); Chen Shen, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 17/608,024

(22) PCT Filed: Jun. 26, 2019

(86) PCT No.: PCT/CN2019/093122
§ 371 (c)(1),
(2) Date: Nov. 1, 2021

(87) PCT Pub. No.: WO2020/258105
PCT Pub. Date: Dec. 30, 2020

(65) Prior Publication Data
US 2022/0318370 A1 Oct. 6, 2022

(51) Int. Cl.
*G06F 21/46* (2013.01)
(52) U.S. Cl.
CPC .................... *G06F 21/46* (2013.01)
(58) Field of Classification Search
None
See application file for complete search history.

(56) References Cited

U.S. PATENT DOCUMENTS

| 11,144,513 | B1* | 10/2021 | Padisetty | G06F 16/122 |
| 11,288,359 | B1* | 3/2022 | Caldwell | H04L 63/102 |
| 2011/0126001 | A1 | 5/2011 | Fu et al. | |
| 2014/0165167 | A1* | 6/2014 | Nunn | G06F 21/335 |
| | | | | 726/6 |

(Continued)

FOREIGN PATENT DOCUMENTS

| CN | 102916806 A | 2/2013 |
| CN | 104811300 A | 7/2015 |

(Continued)

OTHER PUBLICATIONS

"Office Action Issued in China Patent Application No. 201980097715. 4", Mailed Date: Mar. 30, 2023, 16 Pages.
"Second Office Action Issued in Chinese Patent Application No. 201980097715.4", Mailed Date: Sep. 27, 2023, 14 Pages.
International Search Report and Written Opinion for International Patent Application No. PCT/CN2019/093122, date of mailing: Apr. 3, 2020, date of filing: Jun. 26, 2019, 7 pages.

(Continued)

*Primary Examiner* — Michael Pyzocha
(74) *Attorney, Agent, or Firm* — Schwegman Lundberg & Woessner, P.A.

(57) ABSTRACT

An orchestration engine intermittently scans secrets, of different secret types, to identify secrets that are to be rotated. The orchestration engine calls an application programming interface (API) exposed by a serverless management system and wakes up the serverless management system. The serverless management system generates a new secret, stores the new secret for rotation, and interacts with a dependent system in order to revoke an old secret and implement the new secret. Once the secret is rotated, and the new secret is implemented, the orchestration engine stores the new secret in a secret store.

20 Claims, 7 Drawing Sheets

(56) References Cited

U.S. PATENT DOCUMENTS

| | | | | |
|---|---|---|---|---|
| 2015/0089620 | A1* | 3/2015 | Manza | H04L 63/10 |
| | | | | 726/8 |
| 2015/0379259 | A1* | 12/2015 | Mohammed | H04L 63/08 |
| | | | | 726/6 |
| 2016/0156671 | A1* | 6/2016 | Cabrera | H04L 63/20 |
| | | | | 726/1 |
| 2016/0357955 | A1* | 12/2016 | Kruse | G06F 21/31 |
| 2017/0141916 | A1 | 5/2017 | Zhang | |
| 2018/0007048 | A1* | 1/2018 | Weaver | H04L 63/0457 |
| 2018/0032750 | A1* | 2/2018 | Hammel | G06F 21/6218 |
| 2018/0083937 | A1* | 3/2018 | Jahner | G06F 8/60 |
| 2018/0123781 | A1* | 5/2018 | Ness | H04L 9/0891 |
| 2018/0255037 | A1* | 9/2018 | Bender | H04L 63/083 |
| 2019/0109708 | A1 | 4/2019 | Roth | |
| 2020/0082071 | A1* | 3/2020 | Cherny | G06F 21/45 |
| 2021/0050998 | A1* | 2/2021 | Matsuda | H04L 9/16 |
| 2022/0159011 | A1* | 5/2022 | Rinehart | H04L 63/1491 |

FOREIGN PATENT DOCUMENTS

| | | |
|---|---|---|
| CN | 108370315 A | 8/2018 |
| CN | 109416720 A | 3/2019 |
| WO | WO 2018098432 A1 | 5/2018 |

OTHER PUBLICATIONS

"Extended European Search Report Issued in European Patent Application No. 19934728.7", Mailed Date: Jan. 2, 2023, 6 Pages.
Office Action Received for Chinese Application No. 201980097715.4, mailed on Dec. 25, 2023, 4 pages. (English Translation Provided).
Communication Pursuant to Rules 70(2) and 70a (2) EPC received European Application No. 19934728.7, mailed on Jan. 19, 2023, 1 Page.

* cited by examiner

LIFECYCLE MANAGEMENT OF SECRETS ON SERVERLESS PLATFORM

CROSS-REFERENCE TO RELATED APPLICATION

This application is a Section 371 National Stage Application of International Application No. PCT/CN2019/093122, filed Jun. 26, 2019, and published in English as WO2020/258105 A1 on Dec. 30, 2020, the content of which is hereby incorporated by reference in its entirety.

BACKGROUND

Computer systems are currently in wide use. Some computer systems are cloud-based computer systems that host services for client computing systems. The client computing systems may be used by organizations (e.g., tenants) or by other users.

In these types of computing systems, cloud-based applications often interact with multiple external entities to process and store data. To do this in a secure fashion, the cloud-based applications often share "secrets" with the external entities. The cloud-based application and external entities use these "secrets" in order to authenticate communications with one another.

The "secrets" can take a wide variety of different forms. They can range from such things as passwords, to digital certificates, to other encryption keys, to connection strings used to access a database, among a wide variety of other things.

In order to further increase security, it is not uncommon for such computing systems to impose a rule indicating that the "secret" must be rotated (or changed) according to certain criteria. For instance, some computing systems dictate that the "secret" be rotated on a rotation schedule. Other systems may dictate that the "secret" be rotated when other criteria are met.

The discussion above is merely provided for general background information and is not intended to be used as an aid in determining the scope of the claimed subject matter.

SUMMARY

An orchestration engine intermittently scans secrets, of different secret types, to identify secrets that are to be rotated. The orchestration engine calls an application programming interface (API) exposed by a serverless management system and wakes up the serverless management system. The serverless management system obtains a new secret, or initiates the generation of a new secret, stores the new secret for rotation, and interacts with a dependent system in order to revoke an old secret and implement the new secret. Once the secret is rotated, and the new secret is implemented in the dependent system, the orchestration engine stores the new secret in a secret store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
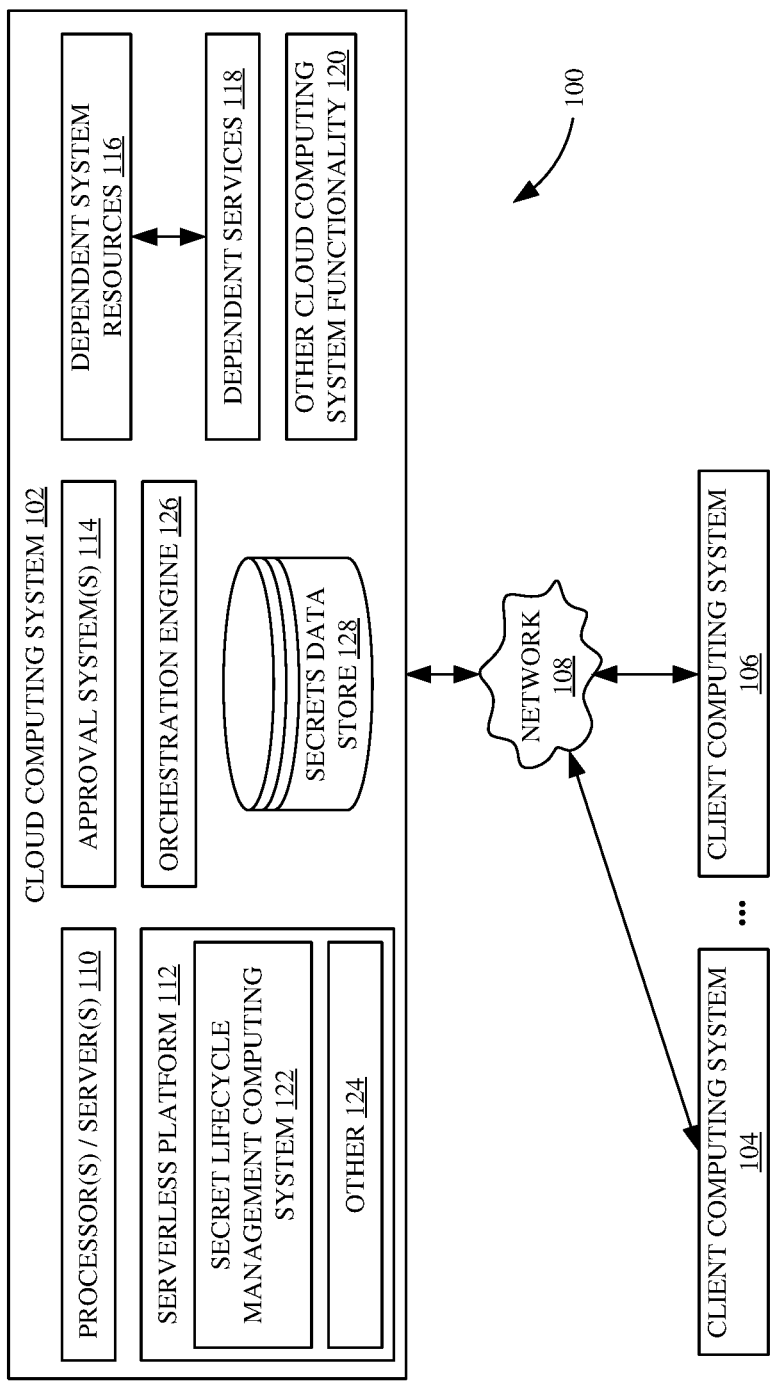
FIG. 1 is a block diagram of one example of a computing system architecture in which secret lifecycle management is performed.

As described above, it is not uncommon for a computing system to maintain security by requiring cloud-based applications to use secret information in order to authenticate communications with external entities (such as resources used by dependent systems, etc.). In order to even further enhance security, it is not uncommon for those computing systems to dictate that the secrets or secret information must be rotated based on a variety of different types of rotation criteria. The secrets can be of different types, and the rotation criteria may vary based upon the type or category of the secret.

There are currently a wide variety of different ways in which this type of rotation is handled. For instance, there are currently systems available that handle the rotation of digital certificates and encryption keys which gain access to the data store where the secrets are stored, and rotate the secrets at a specific time. Other systems notify a user about the expiration of the secret, so that the user can use different tooling to rotate the secret.

Because the secrets can provide access to sensitive data (such as customer data), managing them in a highly secure and effective way can be difficult. Usually, when the secrets are rotated using the currently available systems, there can be a risk of exposing the secret in a manner which breaks various security and compliance restrictions. For instance, a team of users may manage a digital certificate which is used for service-to-service authentication. When the certificate is rotated, this normally means that the team needs to access the new certificate to obtain its details, so that the new certificate can be shared with dependent services that use the certificate for authentication. In this type of scenario, a developer or other team personnel often needs to take the secret out of its secret store, so that it can be whitelisted with the dependent systems. When it is whitelisted, the dependent systems can use the secret details to authenticate a caller. This, however, poses a risk of secret leakage or other unwanted secret exposure.

The present description thus proceeds with respect to a system that automatically rotates secrets in a way that is transparent to the consumers. At no point does a developer or other team personnel need to access any part of the secret in order to perform the whitelisting processes.

Also, in some current systems, the orchestration of secret rotation is performed by an orchestration engine that needs explicit access to the secret store of the consumer, and its resources. This can increase the risk of secret exposure, as there are no clear boundaries in secret handling between one set of customer resources and another. This can increase the attack surface for malicious operations.

Thus, the present description proceeds with respect to a system that has an isolated processing space for each resource category. The process for actually rotating the secret is isolated at a cloud-provider subscription level (which can be mapped to a specific set of resources of a service in an access environment). This is done by using serverless technology to provide isolation and segregation.

FIG. 1 is a block diagram showing one example of a computing system architecture 100. In the example shown in FIG. 1, cloud computing system 102 can be accessed by a plurality of different client computing systems 104-106 using network 108. Thus, network 108 can be any of a wide variety of different types of networks, such as a wide area network, a local area network, a near field communication network, a cellular network, among a wide variety of other networks or combinations of networks.

Cloud computing system 102 illustratively includes one or more processors or servers 110, serverless platform 112, one or more approval systems 114, dependent system resources 116, dependent services 118, orchestration engine 126, secrets data store 128, and it can include a wide variety of other cloud computing functionality 120. Serverless platform 112 illustratively includes secret lifecycle management computing system 122, and it can include other items 124.

Before describing the overall operation of architecture 100 in managing secrets, a brief description of some of the items in architecture 100, and their operation, will first be provided. In one example, dependent services 118 have a front end that exposes an API that can be called by client computing systems 104-106 in order to access dependent system resources 116 through dependent services 118. The dependent services 118, and dependent system resources 116 receive access requests from various client computing system 104-106 for the dependent system resources 116. It will be noted that the client computing systems 104-106 can be used by different organizations (or tenants), they can be used by individual users, etc. Also, the client computing systems 104-106 may have access (e.g., subscriptions) to different dependent system resources 116 through different dependent services 118.

Dependent services 118 may provide access to different external dependent resources 116. In order to access resources 116, services 118 may use different types of secrets, depending upon the different type of dependent system resource 116 that it is accessing. The different types of secrets may include such things as encryption keys, passwords, digital certificates, connection strings, etc. Those secrets are used to authenticate access requests from dependent services 118 (which may be cloud-based applications) to external resources (such as dependent system resources 116).

In one example, it may be that the different types of secrets stored in secrets data store 128 need to be rotated (or changed) based on different types of rotation criteria. In one example, each category or type of secret has its own rotation schedule that dictates when the secrets are to be changed or rotated. Also, each of the different types (or categories) of secrets may have different processes or procedures for rotating them. That is, each different type or category of secret may have different management logic that is executed in order to manage the lifecycle of that type or category of secret.

In one example, the logic used to rotate the different types of secrets is implemented on serverless platform 112 in secret lifecycle management computing system 102. Orchestration engine 126 intermittently identifies when the different types of secrets in secrets data store 128 are to be rotated. It then seeks approval, if needed, from approval system 114. Approval system 114 can be a manual type of approval system where an approved group of users approve rotation requests. Or, approval system 114 can be an automated system where an automated approval process is performed. Once approval for rotation is received, orchestration engine 126 wakes up secret lifecycle management computing system 122 (or the logic in computing system 122 corresponding to the type of secret to be rotated) and invokes that logic to rotate the identified secret. In one example, secret lifecycle management computing system 122 can expose an application programming interface (API) that can be used by orchestration engine 126 to call the logic needed to rotate the secret.

Once invoked, secret lifecycle management computing system 122 uses serverless functionality to generate (or acquire) a new secret, store that secret for acquisition by dependent system resources 116 and dependent services 118 (e.g., whitelists that secret) and notifies the dependent system resources 116 and dependent services 118 that the new secret is available. When it receives acknowledgement from the dependent system resources 116 and dependent services 118 that they are ready for rotation of the secret, system 122 provides an indication to orchestration engine 126 that the secret is to be (or has been) rotated. Orchestration engine 126 then stores the new secret in secrets data store 128.

Thus, the acquisition, whitelisting and revocation of secrets can be done in a manner that is transparent to client computing systems 104-106. Similarly, because the rotation process is performed in a serverless environment, the process is isolated in a different processing space for each category or type of secret, and thus for each category or type of resource for which the secret is used. This reduces the attack surface on which surreptitious attacks can be launched, and thus reduces a likelihood of a surreptitious breach or surreptitious access to the secrets.

Figure 2:
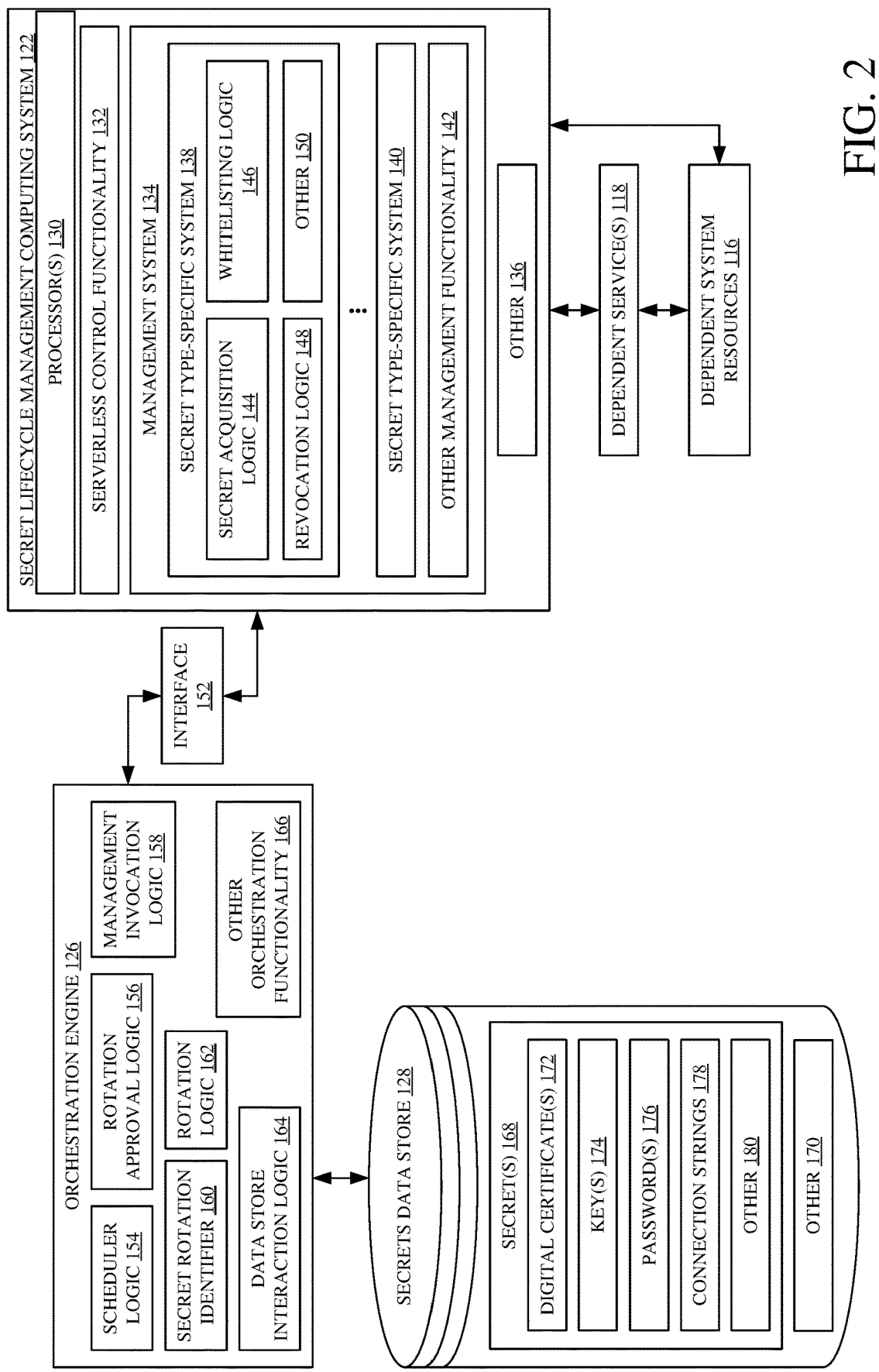
FIG. 2 is a block diagram showing one example of a secret lifecycle management computing system in more detail.

FIG. 2 is a block diagram showing one example of secret lifecycle management computing system 122, orchestration engine 126 and secrets data store 128, in more detail. FIG. 2 shows that secret lifecycle computing system 122 can include one or more processors 130 (which may be the same as processors 110 or different processors), serverless control functionality 132, management system 134, and it can include a wide variety of other items 136. Management system 134, itself, illustratively includes a plurality of different secret type-specific systems 138-140, and it can include a wide variety of other management functionality 142.

The secret type-specific systems 138-140 can be similar, or different. For purposes of the present description, it will be assumed that they are similar so that only secret type-specific system 138 is described in more detail. Each secret type-specific system 138-140 will illustratively include logic that is used to perform the operations for rotating a particular type or category of secret. By way of example, it may be that secret type-specific system 138 has logic that is used to rotate a particular type of digital certificate. It may be that secret type-specific system 140 has the logic that is used to rotate a type of encryption key. These are examples only, and the logic can vary widely, depending upon the particular type of secret that is to be rotated.

In the example illustrated in FIG. 2, secret type-specific system 138 illustratively includes secret acquisition logic 144, whitelisting logic 146, revocation logic 148, and it can include a wide variety of other items 150. Secret acquisition logic 144 is logic that is used to acquire or generate a new secret of the particular category or secret type. For instance, where system 138 is used to manage the lifecycle of an encryption key, then secret acquisition logic 144 is logic used to acquire or generate a new encryption key.

Whitelisting logic 146 is illustratively logic that whitelists the new secret for dependent services 118 and dependent system resources 116 that use that particular secret (or that are dependent on that particular secret). Once the new secret is whitelisted, revocation logic 148 interacts with the dependent services 118 and dependent system resources 116 notifying them that the new secret is available and is to be rotated. It may take some time for systems 118 and resources 116 to obtain and implement the new secret (e.g., to replace the old secret with the new one). Once they have done so, and are ready to use the new secret in their interactions, then they indicate this to revocation logic 148. Revocation logic 148 then sends an indication of this to orchestration engine 126, along with the new secret, which stores the new secret in secrets data store 128.

In one example, management system 134 exposes an application programming interface (API) 152 for interaction by other items, such as orchestration engine 126 and secrets data store 128. It may, for instance, implement four different methods which can include ADD, ROTATE, DELETE and EXPIRYTIMELINE. The ADD interface can be called to add a secret, or an item of logic. The ROTATE interface can be called to rotate a particular secret or set of secrets. The DELETE interface can be called to delete a secret or set of secrets, and the EXPIRYTIMELINE interface can be called to obtain the expiration timeline (or rotation schedule) for a particular secret or category or type of secrets.

Serverless control functionality 132 implements management system 134 on a serverless platform. For instance, the functionality performed by the different types of logic in each secret type-specific system 138 can be run as independent functions in response to events or signals from orchestration engine 126 and/or dependent services 118 and dependent system resources 116. Each of these functions can be designed to run in a stateless fashion. The functions can be performed in an isolated processing space that is isolated based on, for example, the cloud provider subscription. It can also be isolated to a specific set of resources for a service in a particular access environment. It can be isolated in other ways as well.

Orchestration engine 126 illustratively includes scheduler logic 154, rotation approval logic 156, management invocation logic 158, secret rotation identifier 160, rotation logic 162, data store interaction logic 164, and it can include a wide variety of other orchestration functionality 166.

Scheduler logic 154 determines, intermittently, when orchestration engine 126 is to check for secrets that are to be rotated. For instance, it can generate a signal indicating that orchestration engine 126 is to check for secrets that are to be rotated on a periodic basis, based on other criteria, or intermittently, in other ways. In another example, it can generate a signal indicating that orchestration engine 126 is to continuously check for secrets that are to be rotated. It can generate an output indicating that orchestration logic 126 is to check for secret rotation in other ways as well. Secret rotation identifier 160 illustratively scans the various secrets in secrets data store 128 to determine whether any of them are set to expire, or are to be rotated (e.g., replaced with new secrets). This can be done in a variety of different ways. In one example, when a new secret or secret category is added to management system 134, secret rotation identifier 160 calls the EXPIRYTIMELINE interface on interface 152 to obtain the expiration or rotation schedule for that particular type of secret. Secret rotation identifier 160 can obtain other rotation criteria, where the secret is to be rotated based on different criteria, as well. It can store that rotation schedule or other rotation criteria along with the secret in secrets data store 128.

Thus, in one example, secret rotation identifier 160 intermittently scans the various rotation schedule or rotation criteria to determine whether any secrets are to be rotated. If so, it provides an indication of this to rotation approval logic 156. Rotation approval logic 156 accesses a particular approval system 114, when approval for rotation is to be obtained prior to conducting the rotation functions. By way of example, it may be that a particular type or category of secret needs to be manually approved. In that case, rotation approval logic 156 generates a signal to a manual approval system 114 and obtains manual approval for secret rotation. In another example, it may be that rotation approval is automated. In that case, rotation approval logic 156 generates a signal for an automated approval system 114 to automatically obtain approval for secret rotation.

Once secret rotation identifier logic 160 has identified a particular secret, or category or type of secret, that is to be rotated, and once rotation approval logic 156 has obtained approval to rotate that secret, then management invocation logic 158 invokes the particular secret type-specific logic or system 138-140 in management system 134 to rotate the secret (e.g., to replace it with a new secret of the same type). In doing so, for instance, it can call a "ROTATE" interface on interfaces 152 indicating the particular type or category of secret to be rotated. That call is then processed by the particular secret type-specific system 138-140 corresponding to that type or category of secret. In this way, the functions that need to be performed to rotate any particular type or category of secret can be performed by the specific logic needed to perform those functions. As new categories or types of secrets are added, new secret type-specific systems, corresponding to those new categories or types of secrets, can be added to management system 134 as well.

Because management system 134 is deployed on a serverless platform, when an API call is received to rotate a secret, serverless control functionality 132 wakes up management system 134, so that it can identify the particular system logic 138-140 that needs to be executed in response to the "ROTATE" call. Once that item of logic is executed, then serverless control functionality 132 can control management system 134 to release the processors and resources used to execute that logic, in a serverless way.

When the rotation is complete (meaning that dependent services 118 and dependent system resources 116 are ready to use the new secret), then management system 134 indicates this to rotation logic 162 in orchestration engine 126. Rotation logic 162 then obtains the new secret that was generated by management system 134 and provides it to data store interaction logic 164. Data store interaction logic 164 stores the new secret in secrets data store 128.

FIG. 2 also shows that, in one example, secrets data store 128 can include a wide variety of different types of secrets 168. In one example, secrets 168 can be a wide variety of different types of secrets, such as digital certificates 172, encryption keys 174, passwords 176, connection strings 178, and a wide variety of other items 180. Data store 128 can store other items 170, such as the expiration schedules or expiration criteria for those secrets.

Figure 3A:
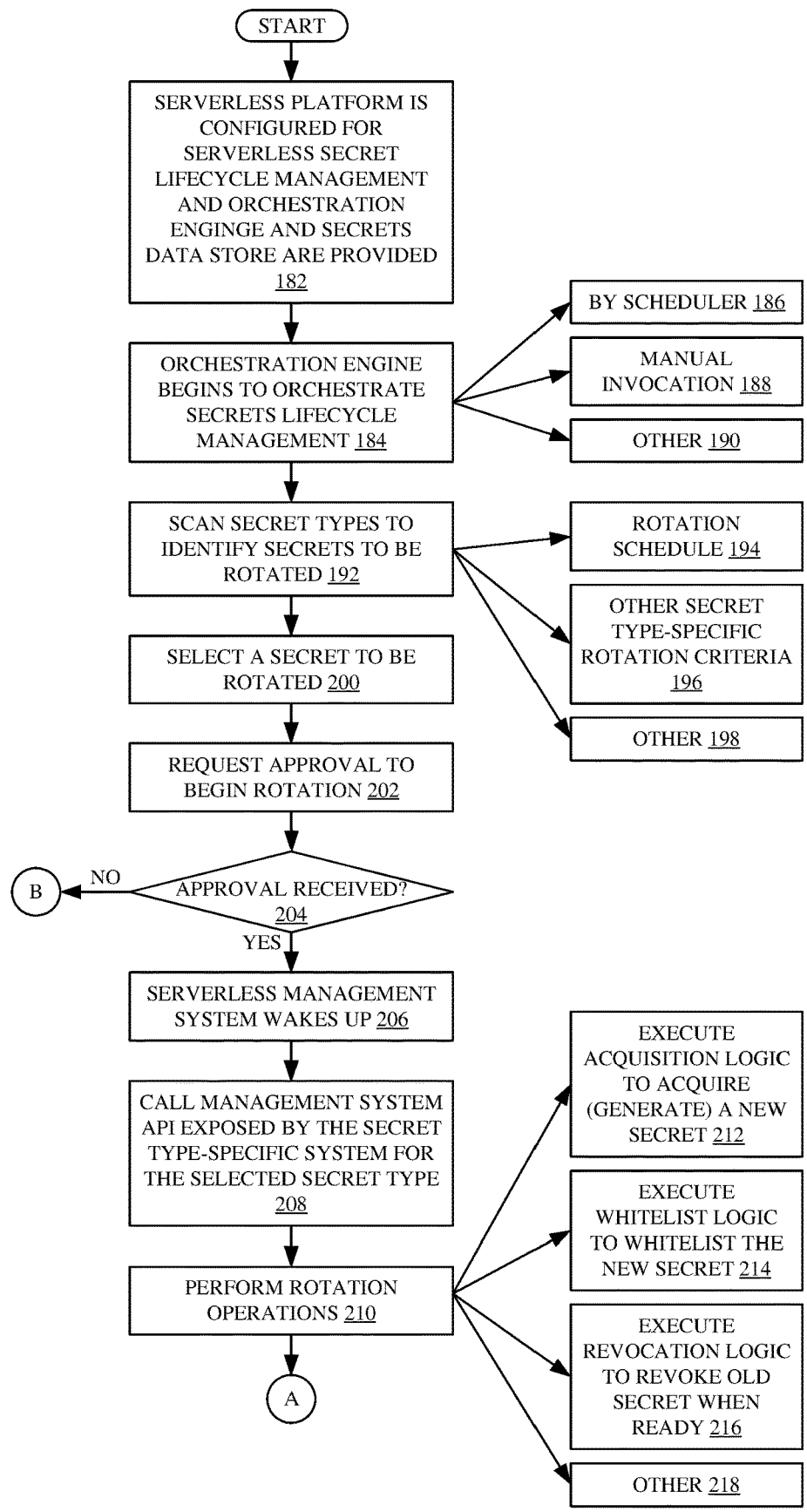
FIGS. 3A and 3B (collectively referred to herein as FIG. 3) show a flow diagram illustrating one example of the operation of the architecture illustrated in FIGS. 1 and 2.
Figure 3B:
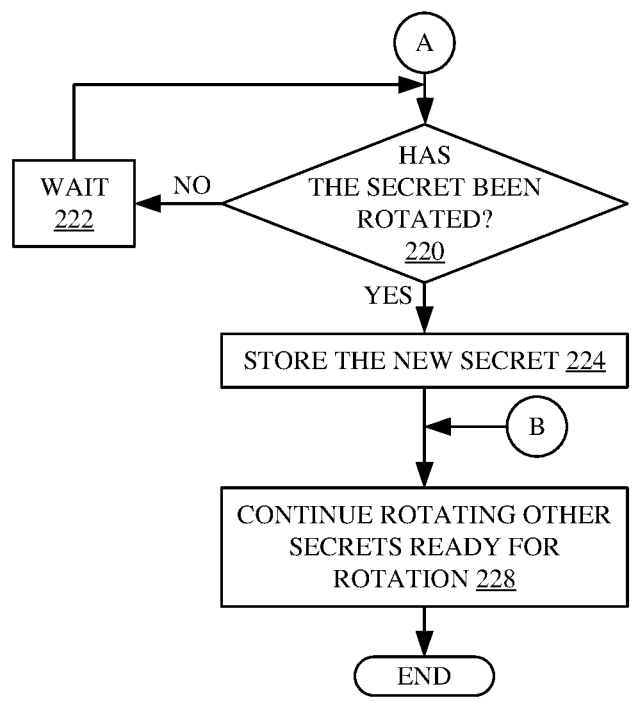

FIGS. 3A and 3B (collectively referred to herein as FIG. 3) show a flow diagram illustrating one example of secret life cycle management.

It is first assumed that serverless platform 112 is configured for serverless secret lifecycle management, and that orchestration engine 126 and secrets data store 128 are provided. This is indicated by block 182 in the flow diagram of FIG. 3. At some point, scheduler logic 154 will trigger orchestration engine 126 to begin to orchestrate a secrets lifecycle management process. Beginning orchestration operation is indicated by block 184 in the flow diagram of FIG. 3.

This can be done based on an orchestration schedule so that scheduler logic 154 requests orchestration engine 126 to begin operation periodically or otherwise intermittently. This is indicated by block 186 in the flow diagram of FIG. 3.

Orchestration engine 126 can also be invoked manually. This is indicated by block 188. Orchestration engine 126 can begin to orchestrate a secrets management operation or process in other ways as well, and this is indicated by block 190.

Secret rotation identifier 160 then identifies any secrets, or types of secrets, in data store 128 that need to be rotated. In one example, it can scan all the secrets to identify secrets to be rotated by examining the expiration schedules or rotation schedules corresponding to those secrets or types or categories of secrets. Scanning the secrets to identify secrets to be rotated is indicated by block 192. Identifying the secrets to be rotated based upon rotation or expiration schedules is indicated by block 194.

Secret rotation identifier 160 can use a wide variety of other secret type-specific rotation criteria as well. This is indicated by block 196. It can identify secrets to be rotated in other ways, other than scanning, as well, as indicated by block 198.

Once a secret or set of secrets have been identified as needing to be rotated, secret rotation identifier 160 selects one of those secrets or sets of secrets for rotation. This is indicated by block 200. When approval is needed, rotation approval logic 156 interacts with approval system 114 to obtain the needed approval. This is indicated by blocks 202. Once approval is obtained, as indicated by block 204, then management invocation logic 158 invokes a management system 134 by making a "ROTATE" call on interfaces 152. This causes serverless control functionality 132 to wake up management system 134 on the serverless platform 112 to respond to the call. Waking up the serverless management system 134 is indicated by block 206 in the flow diagram of FIG. 3. Calling the management system API exposed by the secret type-specific system for the selected secret type is indicated by block 208 in the flow diagram of FIG. 3.

The particular secret type-specific system 138 in management system 134 then performs the rotation operations for that type or category of secret. This is indicated by block 210. In one example, it executes acquisition logic to acquire or generate a new secret. This is indicated by block 212. System 138 can execute whitelist logic 146 to whitelist the new secret for the dependent systems and resources. This is indicated by block 214. It can execute revocation logic 148 to revoke the old secret, and deploy the new secret, as desired. This is indicated by block 216. System 138 can execute other logic to perform type-specific or category-specific operations to rotate the secret as well. This is indicated by block 218.

At some point, revocation logic 148 communicates to dependent services 118 and/or dependent system resources 116 that the new secret is ready and has been whitelisted for their access. Services 118 and resources 116 eventually access the new secret and are ready to use it. When this occurs, they will provide an indication that the old secret has been replaced by the new secret at services 118 and resources 116. Until that happens, revocation logic 148 simply waits to confirm that the secret has indeed been replaced. This is indicated by blocks 220 and 222 in the flow diagram of FIG. 3.

Once revocation logic 148 receives an indication that the new secrets are now deployed on dependent services 118 and resources 116, it provides an indication of this to rotation logic 162. It also provides the newly generated or acquired secret to rotation logic 162. Rotation logic 162 controls data store interaction logic 164 to store the newly generated secret in secrets data store 128. Storing the new secret in secrets data store 128 is indicated by block 224 in the flow diagram of FIG. 3.

Orchestration engine 126 and management system 134 can continue in this way, rotating any other secrets that are ready for rotation. This is indicated by block 228 in the flow diagram of FIG. 3.

Figure 4:
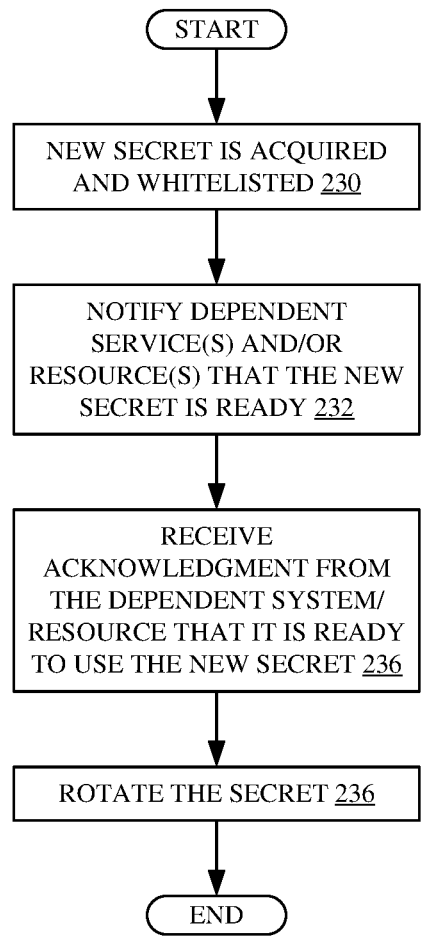
FIG. 4 is a flow diagram illustrating one example of the operation of a management system in interacting with dependent services, in order to rotate a secret.

FIG. 4 is a flow diagram illustrating one example of the operation of secret type-specific system 138 in interacting with dependent services 118 and resources 116 in rotating a secret (e.g., replacing an existing or "old" secret with a new one).

Once the "ROTATE" interface is called, and the appropriate secret type-specific system 138 is woken up on the serverless platform, secret acquisition logic 144 acquires or generates the new secret. Whitelisting logic 146 whitelists that new secret for access by the dependent resources and services 116 and 118. Acquiring or generating the new secret and whitelisting it is indicated by block 230 in the flow diagram of FIG. 4.

Revocation logic 148 then notifies the dependent services and/or resources that the new secret is ready. This is indicated by block 232 in the flow diagram of FIG. 4. It can do this in a wide variety of different ways. It can provide authenticated or trusted communication directly with those systems or services. It can go through another service, or it can communicate with them in other ways.

At some point, the dependent services and resources will acknowledge to revocation logic 148 that they have indeed received the new secret and are ready to use it. This is indicated by block 234 in the flow diagram of FIG. 4. Revocation logic 148 then indicates this to rotation logic 162, and it also sends the new secret to rotation logic 162. It can do this through interfaces 152 or otherwise. This is indicated by block 236 in the flow diagram of FIG. 4. The data store interaction logic in orchestration engine 126 can then store the new secret in data store 128.

It can thus be seen that the present description greatly enhances the security of the computing systems involved. It enhances the security of the entire secret rotation process by reducing the attack surface available to surreptitious users. It automates the process so that the secrets not exposed to various personnel, and the process is transparent to the different client computing systems and users involved.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
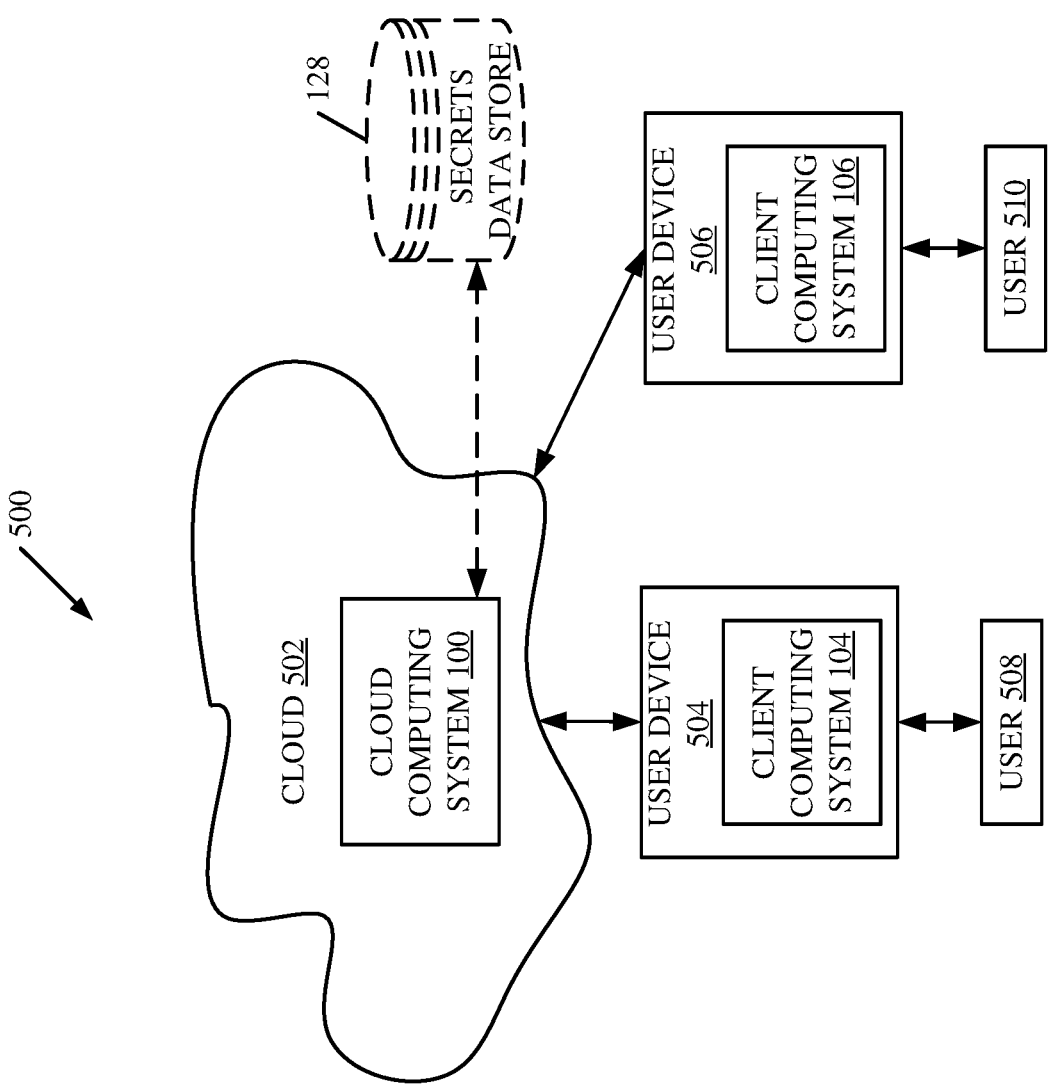
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that cloud computing system 102 can be located in cloud 502 (which can be public, private, or a combination where portions are public while others are private). Therefore, users 508 and 510 uses user device 504 and 506 to access those systems through cloud 502.

FIG. 5 also depicts another example of a cloud architecture. FIG. 5 shows that it is also contemplated that some elements of computing system 102 can be disposed in cloud 502 while others are not. By way of example, secrets data store 128 can be disposed outside of cloud 502, and accessed through cloud 502. Regardless of where they are located, they can be accessed by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
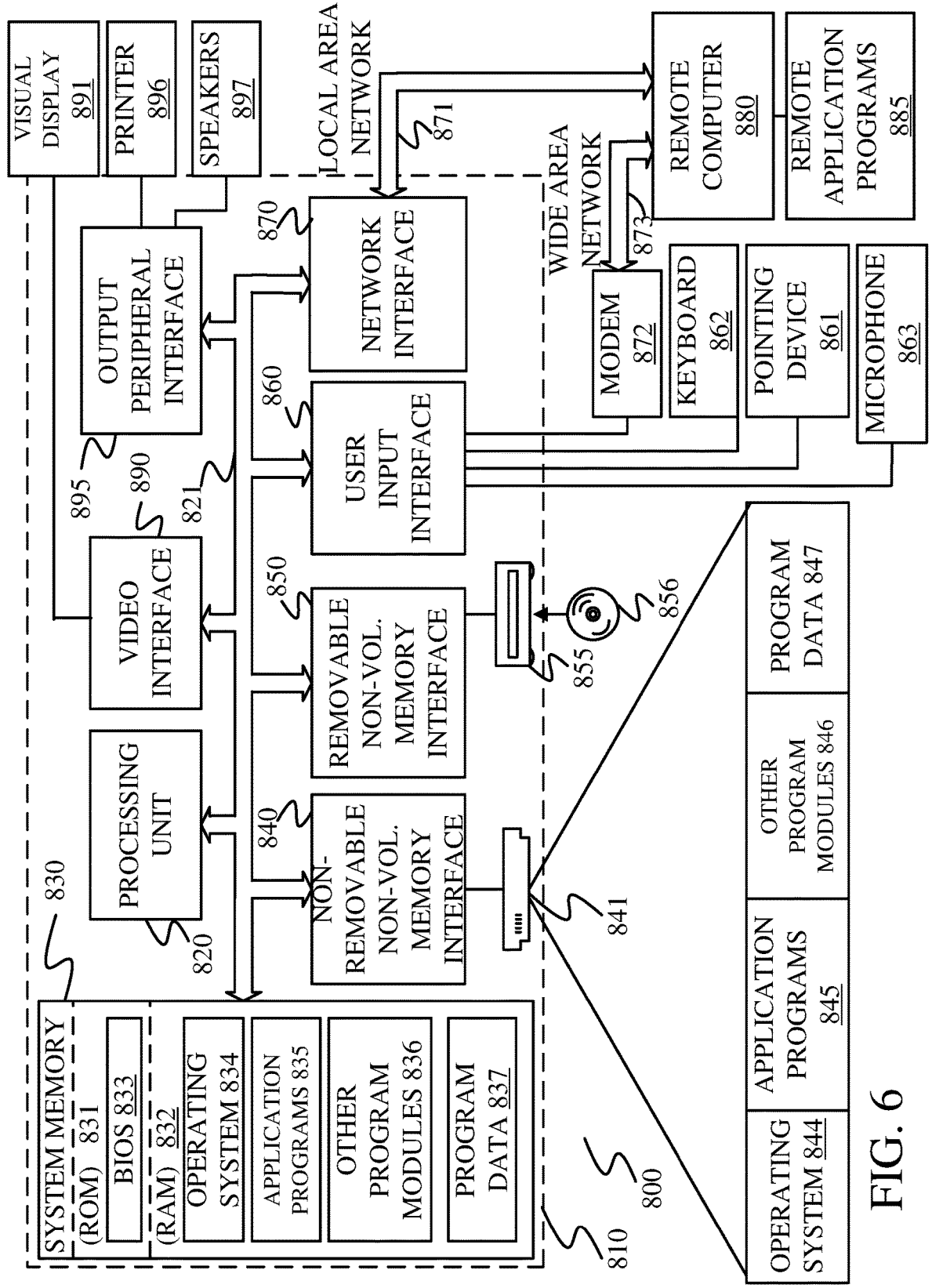
FIG. 6 is a block diagram showing one example of a computing environment that can be used in the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a processor;
a secret type-specific system that performs a replacement process to replace a secret of a given type, that is used by a dependent system, with a new secret of the given type; and
an orchestration engine that identifies the secret, of the given type, to be replaced and calls the secret type-specific system to perform the replacement process to replace the secret of the given type with the new secret, the orchestration engine storing the new secret in a secrets data store, when it has been replaced for use by the dependent system.

Example 2 is the computing system of any or all previous examples and further comprising:

a management system that includes a plurality of different secret type-specific systems that each correspond to a different type of secret and that each perform a different replacement process, based on the corresponding type of secret.

Example 3 is the computing system of any or all previous examples wherein the management system exposes an application programming interface (API) that is called by the orchestration system to replace the secret of the given type.

Example 4 is the computing system of any or all previous examples and further comprising:

serverless control functionality that implements the management system on a serverless platform.

Example 5 is the computing system of any or all previous examples wherein the serverless control functionality is configured to isolate execution of each replacement process based on a dependent resource or dependent service that uses the secret being replaced.

Example 6 is the computing system of any or all previous examples wherein the secret type-specific system comprises:

secret acquisition logic configured to acquire the new secret of the given type.

Example 7 is the computing system of any or all previous examples wherein the secret type-specific system comprises:

secret whitelisting logic configured to whitelist the new secret of the given type for access by the dependent system.

Example 8 is the computing system of any or all previous examples wherein the secret type-specific system comprises:

secret revocation logic configured to interact with the dependent system to indicate that the new secret of the given type is whitelisted and to receive an indication from the dependent system indicating when the dependent system is configured to use the new secret of the given type and generate a revocation output indicating that the dependent system is configured to use the new secret of the given type.

Example 9 is the computing system of any or all previous examples wherein the orchestration engine comprises:

data store interaction logic; and rotation logic configured to receive the new secret of the given type and the revocation output and control the data store interaction logic to replace the secret of the given type with the new secret in the secrets data store.

Example 10 is the computing system of any or all previous examples wherein the orchestration engine comprises:

secret rotation identifier configured to scan rotation criteria to identify the secret of the given type that is to be replaced based on the rotation criteria.

Example 11 is the computing system of any or all previous examples wherein the orchestration engine comprises:

rotation approval logic configured to interact with an approval system corresponding to the identified secret of the given type to obtain approval to replace the secret of the given type.

Example 12 is a computer implemented method, comprising:

identifying a secret, of a given type, to be replaced;

calling a secret type-specific system, implemented on a serverless platform, to perform a type-specific replacement process to replace the secret of the given type, that is used by a dependent system, with a new secret of the given type; and storing the new secret in a secrets data store, when it has been replaced for use by the dependent system.

Example 13 is the computer implemented method of any or all previous examples wherein identifying a secret comprises:

identifying a plurality of different secrets, each of a different secret type, to be replaced.

Example 14 is the computer implemented method of any or all previous examples wherein calling a secret type-specific system, comprises:

calling a plurality of different secret type-specific systems that each correspond to a different type of secret and that each perform a different replacement process, based on the corresponding type of secret.

Example 15 is the computer implemented method of any or all previous examples wherein calling a plurality of different secret type-specific systems comprises:

isolating each different replacement process based on a dependent system that uses the secret being replaced.

Example 16 is the computer implemented method of any or all previous examples wherein the secret type-specific system performs the type-specific replacement process by:

executing secret acquisition logic to acquire the new secret of the given type.

Example 17 is the computer implemented method of any or all previous examples wherein the secret type-specific system performs the type-specific replacement process by:

executing secret whitelisting logic to whitelist the new secret of the given type for access by the dependent system.

Example 18 is the computer implemented method of any or all previous examples wherein the secret type-specific system performs the type-specific replacement process by:

executing secret revocation logic to interact with the dependent system to indicate that the new secret of the given type is whitelisted and to receive an indication from the dependent system indicating when the dependent system is configured to use the new secret of the given type and generate a revocation output indicating that the dependent system is configured to use the new secret of the given type.

Example 19 is the computer implemented method of any or all previous examples wherein identifying a secret comprises:

intermittently scanning rotation criteria to identify the secret of the given type that is to be replaced based on the rotation criteria.

Example 20 is a computing system, comprising:

a processor;

a secret type-specific system that performs a replacement process to replace a secret of a given type, that is used by a dependent system, with a new secret of the given type;

serverless control functionality that implements the secret type-specific system on a serverless platform; and an orchestration engine that identifies the secret, of the given type, to be replaced and calls the secret type-specific system to perform the replacement process to replace the secret of the given type with the new secret, the orchestration engine storing the new secret in a secrets data store, when it has been replaced for use by the dependent system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

a management system that includes a plurality of different secret type-specific systems corresponding to a plurality of different types of secrets, wherein each secret type-specific system, of the plurality of different secret type-specific systems, is specific to a corresponding type of secret of the plurality of different types of secrets and configured to perform a different replacement process to replace a secret of a corresponding type of secret, that is used by a dependent system, with a new secret of the corresponding type of secret, and the management system includes control functionality configured to isolate execution of each replacement process of the plurality of different secret type-specific systems;

at least one processor; and memory storing instructions executable by the at least one processor to provide an orchestration engine configured to:

identify a secret, of a given type, to be replaced;

call a particular secret type-specific system, of the plurality of different secret type-specific systems, based on the given type to be replaced, wherein the particular secret type-specific systems performs a replacement process to replace the secret of the given type with a new secret of the given type; and store the new secret in a secrets data store for use by the dependent system.

2. The computing system of claim 1 wherein the management system exposes an application programming interface (API) that is called by the orchestration engine to replace the secret of the given type.

3. The computing system of claim 1, wherein the control functionality comprises serverless control functionality that implements the management system on a serverless platform.

4. The computing system of claim 3 wherein the serverless control functionality is configured to isolate execution of each replacement process based on a dependent resource or dependent service that uses the secret being replaced.

5. The computing system of claim 1 wherein the secret type-specific system comprises:

secret acquisition logic configured to acquire the new secret of the given type.

6. The computing system of claim 5 wherein the secret type-specific system comprises:

secret whitelisting logic configured to whitelist the new secret of the given type for access by the dependent system.

7. The computing system of claim 6 wherein the secret type-specific system comprises:

secret revocation logic configured to interact with the dependent system to indicate that the new secret of the given type is whitelisted and to receive an indication from the dependent system indicating when the dependent system is configured to use the new secret of the given type and generate a revocation output indicating that the dependent system is configured to use the new secret of the given type.

8. The computing system of claim 7 wherein the orchestration engine comprises:

data store interaction logic; and rotation logic configured to receive the new secret of the given type and the revocation output and control the data store interaction logic to replace the secret of the given type with the new secret in the secrets data store.

9. The computing system of claim 1 wherein the orchestration engine comprises:

secret rotation identifier configured to scan rotation criteria to identify the secret of the given type that is to be replaced based on the rotation criteria.

10. The computing system of claim 9 wherein the orchestration engine comprises:

rotation approval logic configured to interact with an approval system corresponding to the identified secret of the given type to obtain approval to replace the secret of the given type.

11. A computer implemented method, comprising:

identifying a plurality of different secrets, each of a different secret type, to be replaced;

calling a plurality of different secret type-specific systems, implemented on a serverless platform, that each correspond to a different type of secret and that each perform a different replacement process, based on the corresponding type of secret to replace the secret of the corresponding type of secret, that is used by a dependent system, with a new secret of the corresponding type;

isolating each different replacement process based on the dependent system that uses the secret being replaced; and storing the new secret in a secrets data store, when it has been replaced for use by the dependent system.

12. The computer implemented method of claim 11 wherein the secret type-specific system performs a type-specific replacement process by:

executing secret acquisition logic to acquire the new secret of the corresponding type.

13. The computer implemented method of claim 12 wherein the secret type-specific system performs the type-specific replacement process by:

executing secret whitelisting logic to whitelist the new secret of the corresponding type for access by the dependent system.

14. The computer implemented method of claim 13 wherein the secret type-specific system performs the type-specific replacement process by:

executing secret revocation logic to interact with the dependent system to indicate that the new secret of the corresponding type is whitelisted and to receive an indication from the dependent system indicating when the dependent system is configured to use the new secret of the corresponding type and generate a revocation output indicating that the dependent system is configured to use the new secret of the corresponding type.

15. The computer implemented method of claim 11 wherein identifying a secret comprises:

intermittently scanning rotation criteria to identify the secret of the corresponding type that is to be replaced based on the rotation criteria.

16. A computing system, comprising:

a plurality of different secret type-specific-systems corresponding to a plurality of different types of secrets, wherein each secret type-specific system, of the plurality of different secret type-specific systems, is specific to a corresponding type of secret of the plurality of different types of secrets and configured to perform a different replacement process to replace a secret of a corresponding type of secret, that is used by a dependent system, with a new secret of the corresponding type of secret;

serverless control functionality configured to isolate execution of each replacement process of the plurality of different secret type-specific systems on a serverless platform;

at least one processor; and memory storing instructions executable by the at least one processor to provide an orchestration engine configured to:

identify a secret, of a given type, to be replaced;

call a particular secret type-specific system, of the plurality of different secret type-specific systems, based on the given type to be replaced, wherein the particular secret type-specific systems to performs a replacement process to replace the secret of the given type with a new secret of the given type; and store the new secret in a secrets data store for use by the dependent system.

17. The computing system of claim 16, and further comprising an application programming interface (API) that is called by the orchestration engine to replace the secret of the corresponding type of secret.

18. The computing system of claim 16, wherein the particular secret type-specific system is configured to acquire the new secret of the given type.

19. The computing system of claim 18, wherein the particular secret type-specific system is configured to:

whitelist the new secret of the given type for access by the dependent system.

20. The computing system of claim 19, wherein the particular secret type-specific system is configured to:

interact with the dependent system to indicate that the new secret of the given type is whitelisted and to receive an indication from the dependent system indicating when the dependent system is configured to use the new secret of the given type and generate a revocation output indicating that the dependent system is configured to use the new secret of the given type.

* * * * *